United States Patent
Fazel et al.

(10) Patent No.: US 10,683,424 B2
(45) Date of Patent: Jun. 16, 2020

(54) LOW GLOSS, HIGH SOLIDS POLYUREA COATINGS

(71) Applicant: Evonik Operations GmbH, Essen (DE)

(72) Inventors: Shafiq Nisarali Fazel, Allentown, PA (US); Jared Denis Bender, Breinigsville, PA (US)

(73) Assignee: Evonik Operations GmbH, Essen (DE)

( * ) Notice: Subject to any disclaimer, the term of this patent is extended or adjusted under 35 U.S.C. 154(b) by 0 days.

(21) Appl. No.: 14/171,852

(22) Filed: Feb. 4, 2014

(65) Prior Publication Data

US 2014/0221567 A1    Aug. 7, 2014

Related U.S. Application Data

(60) Provisional application No. 61/760,688, filed on Feb. 5, 2013.

(51) Int. Cl.

| | |
|---|---|
| C09D 175/00 | (2006.01) |
| C09D 7/42 | (2018.01) |
| C09D 7/20 | (2018.01) |
| C09D 7/63 | (2018.01) |
| C09D 175/02 | (2006.01) |
| C08K 3/36 | (2006.01) |
| C08G 18/38 | (2006.01) |
| C08G 18/79 | (2006.01) |
| C08K 9/04 | (2006.01) |
| C08K 9/00 | (2006.01) |

(52) U.S. Cl.
CPC ........... *C09D 7/42* (2018.01); *C08G 18/3814* (2013.01); *C08G 18/3821* (2013.01); *C08G 18/792* (2013.01); *C08K 3/36* (2013.01); *C08K 9/00* (2013.01); *C08K 9/04* (2013.01); *C09D 7/20* (2018.01); *C09D 7/63* (2018.01); *C09D 175/02* (2013.01)

(58) Field of Classification Search
CPC .... C09D 175/02; C09D 7/1233; C09D 7/001; C09D 7/005; C08G 18/3814
See application file for complete search history.

(56) References Cited

U.S. PATENT DOCUMENTS

| | | | |
|---|---|---|---|
| 7,736,745 B2 | 6/2010 | Hong | |
| 8,119,245 B2* | 2/2012 | Kendi | C08F 283/006 428/423.1 |
| 8,124,235 B2 | 2/2012 | Hong | |
| 8,178,205 B2 | 5/2012 | Hong | |
| 2005/0065268 A1* | 3/2005 | Morea-Swift et al. | C08K 3/34 524/492 |
| 2005/0271881 A1 | 12/2005 | Hong | |
| 2006/0127666 A1* | 6/2006 | Fuchs | 428/343 |
| 2006/0284829 A1 | 12/2006 | Moriyama et al. | |
| 2008/0051517 A1* | 2/2008 | Okai | C08L 33/08 525/227 |
| 2010/0266764 A1* | 10/2010 | Robinson | C08G 18/0885 427/236 |
| 2011/0313084 A1* | 12/2011 | Furar et al. | C08K 5/52 524/101 |
| 2014/0050928 A1* | 2/2014 | Gebauer | B05D 7/53 428/446 |

FOREIGN PATENT DOCUMENTS

| | | |
|---|---|---|
| CN | 1267694 A | 9/2000 |
| DE | 102012203280 A1 | 9/2013 |
| EP | 2080790 A1 | 7/2009 |
| JP | 2012140533 A | 7/2012 |
| WO | 2004044026 A1 | 5/2004 |
| WO | 2010034109 A1 | 4/2010 |
| WO | 2010112157 A1 | 10/2010 |
| WO | 2010112605 A1 | 10/2010 |
| WO | 2011126562 A2 | 10/2011 |
| WO | 2012000944 A1 | 1/2012 |

OTHER PUBLICATIONS

International Search Report dated Jun. 2, 2014.
Youwei Lia, et al; Development and Prospect of Polyurea Spray Equipment; Shanghai Coatings, vol. 47, No. 5; May 2009; pp. 25-28 (5 pages).
Guo-Hua Chen, et al.; Novel Aliphatic Polyurea Elastomer Based on Polyaspartic Ester; Periodical of Ocean University of China, vol. 38, No. 2; Mar. 2008; pp. 315-318 (4 pages).

* cited by examiner

*Primary Examiner* — Michael L Leonard
(74) *Attorney, Agent, or Firm* — Andrew H. Chung; Linda S. Li; Jason S. Ngui

(57) ABSTRACT

A method of forming a low gloss, high solids polyurea coating containing very low volatile organic compounds (VOC) in the coating composition. The low volatile content not only makes the coating environmentally friendly but allows it to be applied at variable thickness levels and over a wide variety of environmental conditions. The coating composition is comprised of an isocyanate reactive agent containing a secondary diamine, a polyisocyanate, a gloss reducing agent and a viscosity modifier. The gloss reducing agent is generally pre-mixed into an isocyanate reactive agent containing a secondary diamine and/or polyisocyanate containing the viscosity modifier before mixing the two components together to form a low gloss polyurea coating.

19 Claims, No Drawings

LOW GLOSS, HIGH SOLIDS POLYUREA COATINGS

This application claims of the benefit of Application No. 61/760,688, filed on Feb. 5, 2013. The disclosure of Application No. 61/760,688 is hereby incorporated by reference.

BACKGROUND OF THE INVENTION

Polyurea coatings are known in the industry for fast curing, ability to cure at wide temperature/humidity range and excellent performance properties. Polyurea coatings are very versatile and have wide-ranging applications as commercial and industrial protective coatings, and some aliphatic polyureas are used as decorative coatings on walls, floors and other surfaces. Most polyurea coatings are two component thermoset systems that can be applied as a thick coating in one pass if a high solids formulation is used, but usually the applied finish tends to be high in reflectivity or gloss. It is very difficult to reduce or downgloss high solids polyurea coating even with high loadings of gloss reducing agents because such coatings tend to have high viscosity and cure very quickly.

There are applications where a low gloss finish is required for functional or decorative purposes because they are aesthetically preferred. In general, low gloss industrial or commercial coating formulations tend to be low solids, water or solventborne systems and usually contain high loadings of gloss reducing agents such as inorganic silica. To attain low gloss in clear coats, coating compositions are loaded with an excess amount of gloss reducing agent, typically more than 10 weight percent based on the total weight of the composition of the gloss reducing agent. Unfortunately, the gloss reducing agent in these excessively loaded coating compositions tends to coagulate. As a result, the conventional low gloss coatings resulting therefrom can have visually unacceptable cloudy or seedy appearance. Furthermore, the presence of the excessive amount of these gloss reducing agents in a coating composition tends to make the resultant coatings more brittle than conventional coating compositions. Another limitation of the current low gloss waterborne or solventborne coatings are their ability to achieve a thick coating in one pass or application at wide temperature/humidity range because of the high water or solvent content in the formulations. Thus, a need exists in this art for durable low gloss coatings that can be applied in one pass and having a desirable appearance.

BRIEF SUMMARY OF THE INVENTION

The instant invention can solve problems with conventional coatings by providing a high solids polyurea coating having a low gloss value. By "low gloss value" it is meant a gloss value of less than about 50 when measured in accordance with ASTM D-523 and using a glossmeter at an angle of 60° to a coated surface (e.g., a gloss of less than about 50 including about 45 to about 25; and about 40 to 25). By "high solids" it is meant greater than about 70% by weight solids including about 75 to about 95; and about 80 to about 90.

One aspect of the invention relates to a low gloss, high solids polyurea coating that maintains the handling and performance of typical polyureas coatings such as rapid return to service, ability to cure at a wide temperature/humidity range and excellent physical properties. In addition, the inventive low gloss coating can be applied at up to about 30 mils dry film thickness at one pass by using conventional application methods such as a roller, brush or spray and still maintain the gloss value of less than 45 (at 60° angle) when the coating is applied and cured at 5° C. to 35° C. temperature and from 10% to 90% relative humidity.

One aspect of the invention relates to a non-aqueous coating composition comprising:
A. An isocyanate reactive agent comprising at least one secondary diamine wherein the secondary diamine comprises the reaction product of at least one diamine and alkyl esters of 2-butendioic acid;
B. optionally at least one polyisocyanate resin;
C. optionally at least one gloss reducing agent; and
D. At least one viscosity modifier; wherein C) and D) comprise less than about 35% by weight of the total coating composition. By "non-aqueous" it is meant that the coating composition comprises less than about 1 weight percent water and typically about 0 weight percent water.

Another aspect of the invention relates to a composition comprising: a reaction product of at least one diamine and alkyl esters of 2-butendioic acid; and at least one solvent.

A further aspect of the invention relates to a coating composition comprising at least one isocyanate reactive agent, at least one organic polymer, at least one gloss reducing agent and at least one solvent.

Another aspect of the invention relates to a composition comprising at least one viscosity modifier, and the reaction product of bis(4-aminocyclohexyl)methane and an ethyl ester of 2-butendioic acid.

A further aspect of the invention relates to a composition comprising at least one viscosity modifier, and the reaction product of bis(4-amino-3-methylcycohexyl)methane and an ethyl ester of 2-butendioic acid.

The various aspects of the invention can be used alone or in combinations with each other.

DETAILED DESCRIPTION OF THE INVENTION

The instant invention relates to coating compositions and coatings that can be advantageously used to provide protection such as resistance to abrasion, impact, chemical, stain and UV, to a variety of substrates and/or can be used for decorative purposes to enhance the appearance of a certain surface.

The term "coating composition" refers to an uncured fluid composition that is sprayable or that can be brushed/rolled onto a substrate, or into which the substrate can be dipped. The term coating refers to a layer that is derived from the coating composition and is substantially free from water and/or solvent and that has undergone curing in an amount effective to form a thermoset film. The phrase "substantially free from water" means a coating composition comprising less than about 1 weight percent water and typically about 0 weight percent or non-aqueous. A protective coating as defined as one that is disposed directly or indirectly upon the substrate and can comprise one or more layers, one of which is derived from the coating composition. The term "disposed indirectly" refers to a coating that is separated from the substrate by other layers, while the term "disposed directly" refers to layers that in intimate physical contact with the substrate. While any suitable substrate can be coated, examples of such substrates including at least one of concrete, wood, metal, plastic, composites, among other suitable substrates.

Organic polymers that can be used in the coating composition as well as in the coating comprise at least one member selected from the group consisting of thermoplastic polymers, thermosetting polymers, or blends and copolymers of thermoplastic polymers with thermosetting polymers. Examples of suitable organic polymers are dendrimers, elastomers, ionic polymers, copolymers such as block copolymers, graft copolymers, random copolymers, star block copolymers, or the like. Exemplary organic polymers are thermosets. An exemplary thermoset comprises a polyurea.

The organic polymers can comprise at least one member selected from the group consisting of polyacetals, polyureas, polyurethanes, polyolefins, polyacrylics, polycarbonates, polyalkyds, polystyrenes, polyesters, polyamides, polyaramides, polyamideimides, polyarylates, polyarylsulfones, polyethersulfones, polyphenylene sulfides, polysulfones, polyimides, polyetherimides, polytetrafluoroethylenes, polyetherketones, polyether etherketones, polyether ketone ketones, polybenzoxazoles, polyoxadiazoles, polybenzothiazinophenothiazines, polybenzothiazoles, polypyrazinoquinoxalines, polypyromellitimides, polyquinoxalines, polybenzimidazoles, polyoxindoles, polyoxoisoindolines, polydioxoisoindolines, polytriazines, polypyridazines, polypiperazines, polypyridines, polypiperidines, polytriazoles, polypyrazoles, polycarboranes, polyoxabicyclononanes, polydibenzofurans, polyphthalides, polyacetals, polyanhydrides, polyvinyl ethers, polyvinyl thioethers, polyvinyl alcohols, polyvinyl ketones, polyvinyl halides, polyvinyl nitriles, polyvinyl esters, polysulfonates, polysulfides, polythioesters, polysulfones, polysulfonamides, polyureas, polyphosphazenes, polysilazanes, polyolefins, polysiloxanes, fluoropolymers, polybutadienes, polyisoprenes, or a combination comprising at least one of the foregoing organic polymers. Exemplary organic polymers are polyureas. It is desirable for the polyurea to be a thermoset. The aforementioned organic polymers listed above can be blended and/or copolymerized with the polyurea if desired. The amount of organic polymer typically ranges from about 70% to about 95% by weight of the coating composition.

The coating composition also comprises at least one isocyanate reactive agent comprising at least one secondary diamine formed by reaction of diamines with alkyl esters of 2-butendioic acid. The secondary diamine product has the general formula (I):

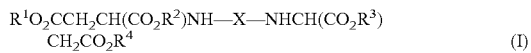

wherein $R^1$, $R^2$, $R^3$, and $R^4$ are the same or different and each are alkyl groups having an amount of about 1 to about 12 carbon atoms.

In one embodiment, the alkyl groups of the secondary diamine product have an amount of 1 to about 4 carbon atoms. An exemplary alkyl group is an ethyl group. $R_5$ can be aliphatic, alicyclic, or aromatic. X– represents a divalent hydrocarbon group obtained by the removal of the amino groups from at least one of 1,4-diaminobutane, 1,6-diaminohexane, 2,2,4- and/or 2,4,4-trimethyl-1,6-diaminohexane, 1-amino-3,3,5-trimethyl-5-aminomethyl-cyclohexane, bis(4-aminocyclohexyl)methane, bis(4-amino-3-methylcycohexyl)methane, ethylene diamine, 1,2-diaminopropane, 1,4-diaminobutane, 2,5-diamino-2,5-dimthylhexane, 1,11-diaminoundecane, 1,12-diaminododecane, 2,4' and' or 2,6-hexahydrotoluyene diamine, 2,4- and/or 2,6-diaminotoluene and 2,4-and/or 4,4' diaminodiphenyl methane, and polyetherdiamines. The amount of the isocyanate reactive agent typically ranges from about 20 to about 70 wt %; including about 25 to about 65 wt %; and about 30 to about 60 wt % of the coating composition. The amine equivalent weight can range from about 100 to about 500 including about 150 to about 450; and about 200 to about 400.

The coating composition can also comprise at least one polyisocyanate that comprises of an isocyanate functional compound having the general formula:

$$R(NCO)i, \quad (II)$$

wherein R is an organic radical having the valence of i, wherein i is greater than or equal to about 2. R can be a substituted or unsubstituted hydrocarbon group (e.g., a methylene group or an arylene group).

The isocyanates can be aromatic or aliphatic. Useful aromatic diisocyanates can comprise, for example, 2,4-toluene diisocyanate and 2,6-toluene diisocyanate (each generally referred to as TDI); mixtures of the two TDI isomers; 4,4'-diisocyanatodiphenylmethane (MDI); p-phenylene diisocyanate (PPDI); diphenyl-4,4'-diisocyanate; dibenzyl-4,4'-diisocyanate; stilbene-4,4'-diisocyanate; benzophenone-4,4'-diisocyanate; 1,3- and 1,4-xylene diisocyanates; or the like, or a combination comprising at least one of the foregoing aromatic isocyanates. Exemplary aromatic diisocyanates for the preparation of polyurethane prepolymers include TDI, MDI, and PPDI.

Useful aliphatic diisocyanates can comprise, for example, 1,6-hexamethylene diisocyanate (HDI); 1,3-cyclohexyl diisocyanate; 1,4-cyclohexyl diisocyanate (CHDI); the saturated diphenylmethane diisocyanate known as H(12)MDI; (also known commercially as bis{4-isocyanatocyclohexyl}methane, 4,4'-methylene dicyclohexyl diisocyanate, 4,4-methylene bis(dicyclohexyl)diisocyanate, methylene dicyclohexyl diisocyanate, methylene bis(4-cyclohexylene isocyanate), saturated methylene diphenyl diisocyanate, and saturated methyl diphenyl diisocyanate), isophorone diisocyanate (IPDI); or the like; or a combination comprising at least one of the foregoing isocyanates. An exemplary aliphatic diisocyanate is H(12)MDI.

Other exemplary polyisocyanates include hexamethylene diisocyanate (HDI), 2,2,4- and/or 2,4,4-trimethyl-1,6-hexamethylene diisocyanate, dodecamethylene diisocyanate, 1,4-diisocyanatocyclohexane, 1-isocyanato-3,3,5-trimethyl-5-isocyanatomethylcyclohexane (IPDI), 2,4'- and/or 4,4'-diisocyanato-dicyclohexyl methane, 2,4- and/or 4,4'-diisocyanato-diphenyl methane and mixtures of these isomers with their higher homologues which are obtained by the phosgenation of aniline/formaldehyde condensates, 2,4- and/or 2,6-diisocyanatotoluene and any mixtures of these compounds. Higher functional hexamethylenediisocyanate (HDI) polyisocyanates such as biurets, trimers, and dimers, was found to be particularly useful for purposes of the present invention. The amount of polyisocyanate typically ranges from about 10 to about 60 wt % including about 25 to about 55 wt %; and about 20 to about 50 wt % of the coating composition.

In one aspect of the invention, R in the formula (II) can also represent a polyurethane radical having a valence of i, in which case R(NCO)i is a composition known as an isocyanate-terminated polyurethane prepolymer or semi-prepolymer. Prepolymers or semi-prepolymers are formed when an excess of organic diisocyanate monomer is reacted with an active hydrogen containing component.

The inventive composition can comprise at least one gloss reducing agent. Examples of suitable gloss reducing agents comprise fine particle powders of organic and inorganic materials, urea-formaldehydes, silicas such as, for example, precipitated silica and fumed silica, polymeric beads, talc, alumina, calcium carbonate, or the like, or a combination comprising at least one of the foregoing gloss reducing agents. An exemplary gloss reducing agent is silica. An example of an exemplary gloss reducing agent is a fine-grained, organic treated precipitated silica. The gloss reducing agent typically have a particle size, d50 of about 0.5 µm to about 20 µm, about 1 µm to about 10 µm and in some cases about 3 µm to about 7 µm. The amount of gloss reducing agent typically ranges from about 1 to about 25 wt % including about 3 to about 20 wt %; and about 5 to about 15 wt % of the coating composition.

The coating composition can also comprise of at least one viscosity modifier. A viscosity modifier can comprise at least one of polar or nonpolar solvents or non-reacting diluents. Examples of solvent comprise at least one member selected from the group consisting of hexane, heptane, xylene, toluene, cyclohexane; ester type one such as methyl acetate, ethyl acetate, t-butyl acetate, acetic acid ethylene glycol monomethyl ether, acetic acid diethylene glycol monomethyl ether, dibasic ester; ether type one such as isopropyl ether, ethylene glycol monomethyl ether, diethylene glycol monobutyl ether; ketone type such as methyl isobutyl ketone, methyl ethyl ketone, isophorone, acetophenone; carbonate type such as propylene carbonate, dimethyl carbonate; Pyrollidone type such as n-methylpyrollidone, n-ethyl pyrollidone; halogenated solvent type such as parachlorobenzotrifluoride, 1,1,2,2-Tetrachloroethane, 1,1-Dichloroethane and any other protic or aprotic solvent that are inert towards amines or polyisocyanates. Examples of non-reacting diluents comprise at least one member selected from the group consisting of phthalate type such as bis(2-ethylhexyl) phthalate, diisononyl phthalate, butyl benzyl phthalate; ester type such as dioctyl adipate, dibutyl sebacate, 1,2-Cyclohexane dicarboxylic acid diisononyl ester, 2,2,4-Trimethyl-1,3-pentanediol diisobutyrate, alkyl sulphonic acid phenyl ester; citrate types such as acetyl triethyl citrate, triethyl citrate; trimellitate type such as trimethyl trimellitate, tri-(2-ethylhexyl) trimellitate and other class of non-reacting diluents such as benzoates, sulfonamides, epoxidized vegetable oils, organophosphates, glycols, polyethers, polybutene and combinations thereof. The amount of viscosity modifier typically ranges from about 2 to about 30 wt % including about 5 to about 25 wt %; and about 10 to about 20 wt % of the coating composition.

Other additives useful in the coating compositions include leveling agents, defoamers, air release agents, antioxidants, UV stabilizers, rheology modifier, pigments, dispersants, plasticizers, diluents, fillers or combinations thereof. The amount of these additives typically ranges from about 0 to about 10% including about 1 to about 5 wt %; and about 2 to about 5 wt % of the coating composition.

The components of the inventive coating composition can be combined by using any suitable conventional equipment and methods. Examples of the foregoing include a blender, agitation with impellar blade, hand mixing with stirring stick, among other conventional equipment.

The components of the coating composition are typically combined in the following order: 1) Isocyanate reactive agent(s), 2) viscosity modifier(s), 3) additive(s), 4) gloss reducing agent (mixed until solution is homogeneous); and 5) polyisocyanate.

The various aspects of this invention can be used alone or in combination. Certain aspects of the invention are illustrated by the following Examples. These Examples shall not limit the scope of the appended claims.

EXAMPLES

In the following examples, the gloss reducing agent was added to the secondary diamine product and dispersed in using a Flacktek Speedmixer™. The isocyanate reactive agent containing the gloss reducing agent and the polyisocyanate resin were then hand mixed together and applied directly to a Leneta chart by a drawdown bar. Unless specified, the films were dried at ambient conditions around 22° C., 50% relative humidity. The thickness of the film was about 2 to 25 mils. The gloss measurements were conducted after letting the coated film cure for at least 24 hours. The gloss measurements were conducted using ASTM D-523 test with glossmeter supplied by Byk-Gardner.

The following ingredients used in the formulations are shown in Table 1:

TABLE 1

| Ingredients | Details |
| --- | --- |
| Secondary diamine A | A reaction product of bis(4-aminocyclohexyl) methane and ethyl ester of 2-butendioic acid |
| Secondary diamine B | A reaction product of bis(4-amino-3-methylcycohexyl) methane and ethyl ester of 2-butendioic acid |
| Flexisolv ™ DBE Solvent | Dibasic ester solvent mixtures from Invista |
| Gloss reducer A | Wax treated precipitated silica such as Acematt ® OK-607 |
| Gloss reducer B | Polymer treated precipitated silica such as Acematt ® 3600 |
| Gloss reducer C | Organic treated silica gel such as Gasil ® UV70C from PQ Corporation |
| Viscosity reducer A | Propanoic acid, 2-methyl-,1,1'-[2,2-dimethyl-1-(1-methylethyl)-1,3-propanediyl] ester |
| Viscosity reducer B | Alkyl sulfonic acid ester diluent |
| Aromatic 100 | Light aromatic Naptha solvent consisting of C9-10 dialkyl and trialkylbenzenes |
| Sylosiv ® A3 | 3 angstroms molecular sieve powder from Grace |

Example 1

The first example shows coating compositions comprising secondary diamine product blended with solvents (i.e., dibasic esters, propylene carbonate, n-methyl pyrollidone or butyl diglyme). The gloss reducing agent is dispersed into the amine blend using a Speedmixer to form a homogeneous mixture. Then the polyisocyanate, hexamethylene diisocyanate trimer is added to the isocyanate reactive mixture at a stoichiometric ratio of 1.05 NCO to amine and hand mixed together before applying it onto a Leneta chart with a drawdown bar at two different thicknesses. The coating is cured for at least 24 hours at ambient conditions before measuring gloss with a glossmeter in accordance with ASTM D523. The data shows that all of the films had 60° gloss of less than 45.

| | Sample 1A wt % | Sample 1B wt % | Sample 1C wt % | Sample 1D wt % | Sample 1E wt % | Sample 1F wt % | Sample 1G wt % | Sample 1H wt % |
| --- | --- | --- | --- | --- | --- | --- | --- | --- |
| Secondary Diamine A | 35.1 | 36.1 | 36.1 | 36.1 | 36.1 | 32.8 | 32.8 | 32.8 |
| Secondary Diamine B | 28.7 | 29.5 | 29.5 | 29.5 | 29.5 | 32.8 | 32.8 | 32.8 |

| Dibasic ester solvent: | | | | | | | | |
|---|---|---|---|---|---|---|---|---|
| Diethyl malonate | 21.2 | | | | | | | |
| Diethyl succinate | | 21.9 | | | | | | |
| Flexisolv DBE-LVP | | | 21.9 | | | | | |
| Flexisolv DBE-5 | | | | 21.9 | | | | |
| Flexisolv DBE-9 | | | | | 21.9 | | | |
| N-methyl pyrrollidone | | | | | | 21.9 | | |
| Butyl diglyme | | | | | | | 21.9 | |
| Propylene carbonate | | | | | | | | 21.9 |
| Gloss reducer A | 15 | 12.5 | 12.5 | 12.5 | 12.5 | 12.5 | 12.5 | 12.5 |
| Amine eq. wt | 441 | 430 | 430 | 430 | 430 | 430 | 430 | 430 |

| 60° Gloss Measurement of cured coating | | | | | | | | |
|---|---|---|---|---|---|---|---|---|
| Dry Film Thickness (mil) | Sample 1A | Sample 1B | Sample 1C | Sample 1D | Sample 1E | Sample 1F | Sample 1G | Sample 1H |
| 5 | 25 | 38 | 30 | 29 | 35 | No data | No data | No data |
| 10 | No data | 38 | 32 | 33 | 38 | 38 | 42 | 41 |

Example 2

Example 2 shows isocyanate reactive agent compositions comprising the secondary diamine blend, a commercial dibasic ester solvent mixture, another additive such as a non-reacting diluent, co-solvent and/or a molecular sieve and the gloss reducing agent. The low gloss coating was formed and applied using similar procedure as Example 1.

| | Sample 2A wt % | Sample 2B wt % | Sample 2C wt % | Sample 2D wt % | Sample 2E wt % | Sample 2F wt % | Sample 2G wt % |
|---|---|---|---|---|---|---|---|
| Secondary Diamine A | 32.5 | 32.4 | 32.4 | 33.7 | 33.7 | 36 | 32.5 |
| Secondary Diamine B | 26.6 | 26.6 | 26.6 | 27.6 | 27.6 | 29 | 26.6 |
| Flexisolv DBE-5 | 8.7 | 4.4 | 4.4 | 8.7 | 8.7 | 9 | |
| Other Additives: | | | | | | | |
| Viscosity reducer A | 13.8 | 13.8 | 13.8 | 17.5 | 17.5 | 4.5 | 13.8 |
| Viscosity reducer B | 5.9 | 5.9 | 5.9 | | | | 5.9 |
| Propylene carbonate | | | | | | 9 | |
| dimethyl carbonate | | 4.4 | | | | | |
| Parachlorobenzotrifluoride | | | 4.4 | | | | |
| Xylene | | | | | | | 8.7 |
| Sylosiv A3 | | | | | 0.5 | | |
| Gloss reducer A | 12.5 | 12.5 | 12.5 | 12.5 | 12 | | |
| Gloss reducer B | | | | | | 12.5 | |
| Gloss reducer C | | | | | | | 12.5 |
| Amine eq. wt | 475 | 475 | 475 | 430 | 430 | 430 | 430 |

| 60° Gloss Measurement of cured coating | | | | | | | |
|---|---|---|---|---|---|---|---|
| Dry Film Thickness (mil) | Sample 2A | Sample 2B | Sample 2C | Sample 2D | Sample 2E | Sample 2F | Sample 2G |
| 10 | 34 | 34 | 39 | 39 | 36 | 41 | 42 |

Example 3

Example 3 shows an isocyanate reactive agent compositions comprising the secondary diamine blend, various solvents and a gloss reducing agent. The coating was formed and applied using similar procedure as Example 1. While these solvents used in this example are effective at producing a useful coating, this Example shows that these solvents do not provide a coating having a gloss of less than 45.

| | Sample 3A wt % | Sample 3B wt % | Sample 3C wt % | Sample 3D wt % | Sample 3E wt % | Sample 3F wt % | Sample 3G wt % | Sample 3H wt % | Sample 3I wt % | Sample 3J wt % | Sample 3K wt % | Sample 3L wt % |
|---|---|---|---|---|---|---|---|---|---|---|---|---|
| Secondary Diamine A | 48 | 36.1 | 36.1 | 36.1 | 36.1 | 36.1 | 36.1 | 36.1 | 36.1 | 36.1 | 36.1 | 36.1 |
| Secondary Diamine B | 39.5 | 29.5 | 29.5 | 29.5 | 29.5 | 29.5 | 29.5 | 29.5 | 29.5 | 29.5 | 29.5 | 29.5 |

-continued

| Solvent: | | | | | | | | | | | | |
|---|---|---|---|---|---|---|---|---|---|---|---|---|
| Propylene glycol diacetate | 21.9 | | | | | | | | | | | |
| Dipropylene glycol methyl ether acetate | | 21.9 | | | | | | | | | | |
| Ethylene glycol mononbutylether acetate | | | 21.9 | | | | | | | | | |
| Propylene glycol monoethyl ether acetate | | | | 21.9 | | | | | | | | |
| Aromatic 100 | | | | | 21.9 | | | | | | | |
| Methyl amyl ketone | | | | | | 21.9 | | | | | | |
| Dipropylene glycol dimethyl ether | | | | | | | 21.9 | | | | | |
| Parachlorobenzotrifluoride | | | | | | | | 21.9 | | | | |
| Dimethyl carbonate | | | | | | | | | 21.9 | | | |
| t-butyl acetate | | | | | | | | | | 21.9 | | |
| Xylene | | | | | | | | | | | 21.9 | |
| Gloss reducer A | 12.5 | 12.5 | 12.5 | 12.5 | 12.5 | 12.5 | 12.5 | 12.5 | 12.5 | 12.5 | 12.5 | 12.5 |
| Amine eq. wt | 320 | 430 | 430 | 430 | 430 | 430 | 430 | 430 | 430 | 430 | 430 | 430 |

| 60° Gloss Measurement of cured coating | | | | | | | | | | | | |
|---|---|---|---|---|---|---|---|---|---|---|---|---|
| Dry Film Thickness (mil) | Sample 3A | Sample 3B | Sample 3C | Sample 3D | Sample 3E | Sample 3F | Sample 3G | Sample 3H | Sample 3I | Sample 3J | Sample 3I | Sample 3m |
| 10 | 92 | 83 | 68 | 80 | 88 | 89 | 84 | 71 | 81 | 85 | 83 | 79 |

Example 4

Example 4 shows one particular isocyanate reactive agent composition comprising secondary diamine blend, Flexisolv DBE-5, Viscosity reducer A and the Gloss reducer A fumed silica. This isocyanate reactive agent containing the gloss reducing agent was mixed with the polyisocyanate, hexamethylene diisocyanate trimer at 1.05 NCO to amine ratio and applied on a Leneta chart at 2, 10 and 25 dry film thicknesses. The process was repeated two more times and each of the Leneta chart was cured at three different conditions; Ambient (22° C., 50% relative humidity); Low temperature (5° C.) and high temperature/humidity (35° C., 80%). The results show that a low gloss polyureas coating can be achieved when applied at wide temperature/humidity conditions and at wide thickness ranges.

| | Sample 4A wt % |
|---|---|
| Secondary Diamine A | 32.9 |
| Secondary Diamine B | 26.9 |
| Flexisolv DBE-5 | 8.5 |
| Viscosity reducer A | 17.1 |
| Gloss reducer A | 14.6 |
| Amine eq. wt | 430 |

| 60° Gloss Measurement of cured coating | |
|---|---|
| Dry Film Thickness (mil) | Sample 4A |
| 22° C., 50% Relative Humidity | |
| 2 | 24 |
| 10 | 31 |
| 25 | 38 |
| 5° C. | |
| 2 | 30 |
| 10 | 34 |
| 25 | 39 |
| 35° C., 80% Relative Humidity | |
| 2 | 34 |
| 10 | 38 |
| 25 | 35 |

The present invention is not to be limited in scope by the specific aspects or embodiments disclosed in the examples which are intended as illustrations of a few aspects of the invention and any embodiments that are functionally equivalent are within the scope of this invention. Various modifications of the invention in addition to those shown and described herein will become apparent to those skilled in the art and are intended to fall within the scope of the appended claims.

The invention claimed is:

1. A one-coat film comprising an uncured non-aqueous polyurea coating composition comprising:
    A) about 20 to about 70 wt % of the coating composition of an isocyanate reactive agent comprising at least one secondary diamine comprising the reaction product of bis(4-aminocyclohexyl)methane and ethyl ester of 2-butenedioic acid;
    B) about 10 to about 60 wt % of the coating composition of at least one polyisocyanate selected from the group consisting of hexamethylene diisocyanate biurets, hexamethylene diisocyanate trimers and hexamethylene diisocyanate dimers;
    C) about 1 to about 25 wt % of the coating composition of at least one gloss reducing agent; and
    D) about 2 to about 30 wt % of the coating composition of at least one viscosity modifier; wherein the gloss reducing agent comprises an organic treated precipitated silica; wherein the organic treated precipitated silica has a d50 particle size of about 3 um to about 7 um; wherein the composition comprises greater than about 70% by weight solids and less than about 1% by weight water; wherein the film is applied at one pass; wherein the film has a thickness of about 2 to about 25 mils and wherein a cured coating of the film has a 60 degree gloss value of <45.

2. The film of claim 1, wherein the viscosity modifier comprises at least one member selected from the group consisting of hexane, heptane, xylene, toluene, cyclohexane; methyl acetate, ethyl acetate, t-butyl acetate, acetic acid ethylene glycol monomethyl ether, acetic acid diethylene glycol monomethyl ether, dibasic ester; isopropyl ether, ethylene glycol monomethyl ether, diethylene glycol monobutyl ether; methyl isobutyl ketone, methyl ethyl ketone, isophorone, acetophenone; propylene carbonate, dimethyl carbonate; n-methyl pyrollidone, n-ethyl pyrollidone; parachlorobenzotrifluoride, 1,1,2,2-Tetrachl oroethane, and 1,1-Dichloroethane.

3. The film of claim 1, wherein the viscosity modifier comprises at least one member selected from the group consisting of bis(2-ethylhexyl) phthalate, diisononyl phthalate, butyl benzyl phthalate; dioctyl adipate, dibutyl sebacate, 1,2-Cyclohexane dicarboxylic acid diisononyl ester, 2,2,4-Trimethyl -1,3-pentanediol diisobutyrate, alkyl sulphonic acid phenyl ester; acetyl triethyl citrate, triethyl citrate; trimethyl trimellitate, tri-(2-ethylhexyl) trimellitate benzoates, sulfonamides, epoxidized vegetable oils, organophosphates, glycols, polyethers, and polybutene.

4. A one-coat film comprising an uncured non-aqueous polvurea coating composition comprising about 2 to about 30 wt % of the coating composition at least one viscosity modifier, about 10 to about 60 wt % of the coating composition of at least one polyisocyanate selected from the group consisting of hexamethylene diisocyanate biurets, hexamethylene diisocyanate trimers and hexamethylene diisocyanate dimers, about 20 to about 70 wt % of the coating composition of an isocyanate reactive agent comprising at least one secondary diamine comprising the reaction product of bis(4-amino-3-methylcyclohexyl)methane and ethyl ester of 2-butendioic acid, and about 1 to about 25 wt % of the coating composition of an organic treated precipitated silica; wherein the organic treated precipitated silica has a d50 particle size of about 3 um to about 7 um; wherein the composition comprises greater than about 70% by weight solids and less than about 1% by weight water; wherein the film is applied at one pass; wherein the film has a thickness of about 2 to about 25 mils and wherein a cured coating of the film has a 60 degree gloss value of <45.

5. The film of claim 1, further comprising at least one member selected from the group consisting of leveling agents, defoamers, air release agents, antioxidants, UV stabilizers, rheology modifier, pigments, dispersants, plasticizers, diluents, fillers and combinations thereof.

6. The film of claim 5, wherein the amount of said member ranges from about 1 to about 5 wt %.

7. The film of claim 1, wherein the gloss reducing agent comprises a wax treated precipitated silica.

8. The film of claim 1, wherein the gloss reducing agent comprises a polymer treated precipitated silica.

9. A one-coat film comprising an uncured non-aqueous polyurea coating composition comprising:
A) a reaction product of bis(4-aminocyclohexyl)methane and an ethyl ester of 2-butendioic acid;
B) a reaction product of bis(4-amino-3-methylcyclohexyl)methane and an ethyl ester of 2-butendioic acid;
C) an organic treated silica;
D) at least one solvent; and
E) at least one polyisocyanate selected from the group consisting of hexamethylene diisocyanate biurets, hexamethylene diisocyanate trimers and hexamethylene diisocyanate dimers;
wherein the composition comprises greater than about 70% by weight solids and less than about 1% by weight water; wherein the organic treated silica has a d50 particle size of about 3 um to about 7 um; wherein the film is applied at one pass; wherein the film has a thickness of about 2 to about 25 mils and wherein a cured coating of the film has a 60 degree gloss value of <45.

10. The film of claim 9, wherein the solvent comprises at least one dibasic ester solvent.

11. The film of claim 10, wherein the silica comprises a wax treated precipitated silica having a d50 particle size of about 3 um to about 7 um.

12. The film of claim 10, wherein the silica comprises a polymer treated precipitated silica having a d50 particle size of about 3 um to about 7 um.

13. The film of claim 1 wherein the viscosity modifier comprises at least one member selected from the group consisting of propylene carbonate, dimethyl carbonate; n-methyl pyrollidone and butyl diglyme.

14. The film of claim 4, wherein the viscosity modifier comprises at least one member selected from the group consisting of hexane, heptane, xylene, toluene, cyclohexane; methyl acetate, ethyl acetate, t-butyl acetate, acetic acid ethylene glycol monomethyl ether, acetic acid diethylene glycol monomethyl ether, dibasic ester; isopropyl ether, ethylene glycol monomethyl ether, diethylene glycol monobutyl ether; methyl isobutyl ketone, methyl ethyl ketone, isophorone, acetophenone; propylene carbonate, dimethyl carbonate; n-methyl pyrollidone, n-ethyl pyrollidone; parachlorobenzotrifluoride, 1,1,2,2-Tetrachl oroethane, and 1,1-Dichloroethane.

15. The film of claim 4, wherein the viscosity modifier comprises at least one member selected from the group consisting of bis(2-ethylhexyl) phthalate, diisononyl phthalate, butyl benzyl phthalate; dioctyl adipate, dibutyl sebacate, 1,2- Cyclohexane dicarboxylic acid diisononyl ester, 2,2,4-Trimethyl-1,3-pentanediol diisobutyrate, alkyl sulphonic acid phenyl ester; acetyl triethyl citrate, triethyl citrate; trimethyl trimellitate, tri-(2-ethylhexyl) trimellitate benzoates, sulfonamides, epoxidized vegetable oils, organophosphates, glycols, polyethers, and polybutene.

16. The film of claim 4, further comprising at least one member selected from the group consisting of leveling agents, defoamers, air release agents, antioxidants, UV stabilizers, rheology modifier, pigments, dispersants, plasticizers, diluents, fillers and combinations thereof.

17. The film of claim 16, wherein the amount of said member ranges from about 1 to about 5 wt %.

18. The film of claim 4, wherein the gloss reducing agent comprises a wax treated precipitated silica.

19. The film of claim 4, wherein the gloss reducing agent comprises a polymer treated precipitated silica.

* * * * *